(12) United States Patent
Shin et al.

(10) Patent No.: US 8,425,989 B2
(45) Date of Patent: Apr. 23, 2013

(54) PHOTOALIGNMENT MATERIAL AND METHOD OF MANUFACTURING DISPLAY SUBSTRATE USING THE SAME

(75) Inventors: Gyo-Jic Shin, Hwaseong-si (KR); Hyun-Ku Ahn, Hwaseong-si (KR); Hoi-Lim Kim, Eujeongbu-si (KR)

(73) Assignee: Samsung Display Co., Ltd., Yongin (KR)

( * ) Notice: Subject to any disclaimer, the term of this patent is extended or adjusted under 35 U.S.C. 154(b) by 501 days.

(21) Appl. No.: 12/563,406

(22) Filed: Sep. 21, 2009

(65) Prior Publication Data
US 2010/0197186 A1 Aug. 5, 2010

(30) Foreign Application Priority Data
Feb. 3, 2009 (KR) .................. 10-2009-0008282

(51) Int. Cl.
*G02F 1/1337* (2006.01)
*C09K 19/56* (2006.01)
*C09K 19/54* (2006.01)

(52) U.S. Cl.
USPC ..... 428/1.2; 428/1.26; 252/299.4; 252/299.5; 349/123

(58) Field of Classification Search .................. 428/1.2, 428/1.26; 252/299.5, 299.4; 349/123
See application file for complete search history.

(56) References Cited

U.S. PATENT DOCUMENTS

| | | | | |
|---|---|---|---|---|
| 4,694,049 | A * | 9/1987 | Morita et al. ............. 525/440.12 |
| 5,789,121 | A * | 8/1998 | Cywar et al. ........................ 430/9 |
| 2003/0020843 | A1* | 1/2003 | Onishi et al. ..................... 349/32 |
| 2004/0209016 | A1* | 10/2004 | Ishida et al. ................ 428/32.34 |
| 2007/0002243 | A1* | 1/2007 | Kim ............................. 349/139 |
| 2010/0213423 | A1* | 8/2010 | Shiau et al. .................... 252/589 |

FOREIGN PATENT DOCUMENTS

| | | |
|---|---|---|
| JP | 2004-053685 | 2/2004 |
| KR | 1020020027007 | 4/2002 |
| KR | 1020060114580 | 11/2006 |

* cited by examiner

*Primary Examiner* — Shean C Wu
(74) *Attorney, Agent, or Firm* — H.C. Park & Associates, PLC (57) ABSTRACT

A photoalignment material and a method of manufacturing of a display substrate using the photoalignment material are disclosed. The photoalignment material includes a photoalignment polymer, a photoalignment additive, and an organic solvent. When the photoalignment additive is used, a side reaction due to ultraviolet (UV) light may be prevented, and the stability of alignment layer may be improved.

20 Claims, 3 Drawing Sheets

PHOTOALIGNMENT MATERIAL AND METHOD OF MANUFACTURING DISPLAY SUBSTRATE USING THE SAME

CROSS REFERENCE TO RELATED APPLICATION

This application claims priority from and the benefit of Korean Patent Application No. 2009-8282, filed on Feb. 3, 2009, which is hereby incorporated for all purposes as if fully set forth herein.

BACKGROUND OF THE INVENTION

1. Field of the Invention

Exemplary embodiments of the present invention relate to a photoalignment material and a method of manufacturing a display substrate using the photoalignment material.

2. Description of the Background

Generally, liquid crystal display (LCD) devices have been in great demand as the display industry has grown. Advances in LCD devices include low driving voltages, high resolutions, slim sizes, and flat screens. One of the core manufacturing techniques of LCD devices is a photoalignment technique to align liquid crystals in a desired direction by using ultraviolet (UV) light.

To form an alignment layer, static electricity may be generated using a rubbing cloth during a rubbing process; however, a display substrate of the LCD may be damaged by the static electricity. Moreover, the display substrate may easily be polluted and stained in the rubbing process, so that a display quality of the LCD may decrease. In order to prevent damage from static electricity and to improve the display quality, a photoalignment process is needed, wherein the process may include spreading a photoalignment material on the base substrate and photolyzing, photoisomerizing, or photopolymerizing the photoalignment material using light.

Generally, in a photoalignment layer, a photoreactive group coupled to a side chain of a polyimide may be irradiated with UV light to align liquid crystals in an irradiation direction. Active research has been conducted on the photoalignment process to simplify the process and make the process more convenient in comparison to the rubbing process. However, physical, chemical, electrical and electronic characteristics of the aligned liquid crystal layer are still weak, and thus mass production may still be difficult.

In addition, in a photoalignment process, a liquid crystal alignment may be induced by a light reaction. However, a voltage holding ratio (VHR) may be reduced, and afterimages may become worse due to a side reaction caused by polarized and non-polarized UV irradiation of the photoreactive polymer. The display quality of the LCD panel may thus deteriorate.

SUMMARY OF THE INVENTION

Exemplary embodiments of the present invention provide a photoalignment material to improve the stability of an alignment layer in a LCD device.

Exemplary embodiments of the present invention also provide a display substrate using the photoalignment material.

Additional features of the invention will be set forth in the description which follows, and in part will be apparent from the description, or may be learned by practice of the invention.

Exemplary embodiments of the present invention disclose a photoalignment material comprising a photoalignment polymer, a photoalignment additive, and an organic solvent. The photoalignment polymer has a weight of about 1 percent to about 10 percent of a weight of the photoalignment material. The photoalignment additive comprises an ultraviolet stabilizer to block or to absorb ultraviolet light. A weight of the photoalignment additive is about 0.001 percent to about 2 percent of the weight of the photoalignment material.

Exemplary embodiments of the present invention disclose a photoalignment material comprising a photoalignment polymer, a photoalignment additive, and an organic solvent. The photoalignment polymer has a weight of about 1 percent to about 10 percent of a weight of the photoalignment material. The photoalignment additive comprises an epoxy compound comprising two to four epoxy groups. A weight of the photoalignment additive is about 0.01 percent to about 3.5 percent of the weight of the photoalignment material.

Exemplary embodiments of the present invention disclose a method of manufacturing a display substrate. The method comprises forming a pixel unit on a base substrate, and forming an alignment layer by coating a photoalignment material on the base substrate. The photoalignment material comprises a photoalignment polymer, an organic solvent, and a photoalignment additive. The photoalignment additive comprises an ultraviolet stabilizer to block or to absorb ultraviolet light. The method further comprises irradiating light on the base substrate comprising the alignment layer.

Exemplary embodiments of the present invention disclose a method of manufacturing a display substrate. The method comprises forming a pixel unit on a base substrate, and forming an alignment layer by coating a photoalignment material on the base substrate. The photoalignment material comprises a photoalignment polymer, an organic solvent, and a photoalignment additive. The photoalignment additive comprises an epoxy compound having two to four epoxy groups. The method further comprises irradiating light onto the base substrate comprising the alignment layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Exemplary embodiments of the present invention are described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Photoalignment Material

A photoalignment material according to exemplary embodiments of the present invention may include a photoalignment polymer, a photoalignment additive including an ultraviolet (UV) stabilizer to block or absorb UV light, and a remainder of an organic solvent.

Photoalignment Polymer

The photoalignment polymer may form a film having a predetermined thickness on a substrate, and may include a repeating unit. Examples of the photoalignment polymer may include, but are not limited to, conventional alignment polymers for a vertical alignment mode or for a twisted nematic mode.

The photoalignment polymer may contain a photoreactive branch group having a photoreactive portion. The photoreactive branch group may be coupled to a main chain including, for example, a polyimide compound, a polyamic acid compound, a polysiloxane compound, a polyvinyl cinnamate compound, a polyacrylate compound, and/or a polymethyl methacrylate compound. The photoreactive portion may include, for example, When an monodisperse polystyrene-reduced weight-average molecular weight of the photoalignment polymer is less than about 1,000 g, polymeric characteristics of the photoalignment polymer may be deteriorated. The molecular weight may be measured by gel permeation chromatography (GPC). When the average molecular weight of the photo alignment polymer is greater than about 1,000,000 g, deposits of the photoalignment polymer may easily be generated at a low temperature. Thus, printing the photoalignment material may be difficult. Therefore, the average molecular weight of the photoalignment polymer may be, for example, between approximately 1,000 and 1,000,000.

For example, a diamine compound and an acid anhydride may react with each other to yield a polyamic acid compound. The polyamic acid compound may be partially imidized to prepare the photoalignment polymer having the polyimide compound.

The photoalignment polymer may be approximately 1% to 10% of a total weight of the photoalignment material. When the content of the photoalignment polymer is less than about 1% of the photoalignment material's weight, forming a film on a substrate may be difficult. When the content of the photoalignment polymer is greater than about 10% of the photoalignment material's weight, the solid components of the photoalignment polymer may not fully dissolve in the organic solvent thereby causing deposits of the solid components. Furthermore, uniform coating of the photoalignment material on a substrate may be difficult. Thus, the content of the photoalignment polymer may be, for example, approximately 1% to 10% of the photoalignment material's weight, and more preferably about 3% to 6% of the photoalignment material's weight.

Photoalignment Additive

The photoalignment additive may include a UV stabilizer. The UV stabilizer may absorb UV light, and may convert the UV light into infrared (IR) light and thermal energy to emit the IR light and the thermal energy. In some cases, the UV stabilizer may prevent a photoalignment polymer from absorbing the UV light. In some cases, the UV stabilizer may not absorb UV light, but may receive energy from the photoalignment polymer excited by absorbing light, so that the photoalignment polymer may be protected.

The UV stabilizer may include a UV absorber. The UV stabilizer may further include quenchers, a hindered amine light stabilizer (HALS), and/or a combination thereof.

The UV absorber may selectively absorb UV energy, and may convert the UV energy into IR light and thermal energy. The UV absorber may also absorb or acquire a free radical.

For example, the UV stabilizer may include a phenol compound, an aromatic amine compound, a benzophenone compound, a benzotriazole compound, an acrylate compound, and a salicylic acid derivative, alone or in any combination thereof.

A photoalignment additive may include at least one absorber selected from the group consisting of UV absorbers represented by the following Chemical Formulas 1 to 4.

Chemical Formula 1

Chemical Formula 2

Chemical Formula 3

Chemical Formula 4

In Chemical Formula 4, $R_1$ may independently represent —$(CH_2)_n$—, and n may be an integer in the range of 1 to 4.

The UV stabilizer may absorb light of a wavelength in a range of about 290 nm to about 400 nm. The UV stabilizer may also prevent a side reaction in which amino groups and ether groups included in a polyimide are decomposed by polarizing UV irradiation and depolarizing UV irradiation of the photoreactive polymer. Prevention of the side reaction may improve a voltage holding ratio (VHR) of a LCD device and limit effects of afterimages. Also, alignment stability may be improved. In some cases, as shall be explained further below, a photoalignment material may have a UV stabilizer having an epoxy compound.

The quenchers may be stabilized by the UV stabilizer, and may convert energy into fluorescence, phosphorescence, and heat. A nickel chelator may be used as a quencher.

For example, the quenchers may include nickel sulfate, nickel nitrate, nickel chloride, nickel bromide, nickel fluoride, nickel acetate, nickel acetyl acetonate, and nickel hydroxide, alone or in any combination thereof.

The HALS may be a radical scavenger. The HALS may remove a free radical generated in a photolysis reaction to stop a photo-oxidation reaction. The HALS may easily be oxidized and converted to a nitroxy radical. The nitroxy radical may react with a polymer radical to produce a hydroxylamine ether. In addition, the HALS may react with a peroxide radical to generate a stable nitroxy radical, so that the photo-oxidation reaction may be stopped. The HALS may remove a radical and may protect a surface of the photoalignment polymer.

In some cases, the HALS may include bis(2,2,6,6-tetramethyl-4-piperidyl)sebacate, 4-benzoiloxy-2,2,6,6,-tetramethylpiperidine, 1,2,3,4-tetrakis(2,2,6,6,-tetramethyl-4-piperidyl)-butanetetracarboxylate, 1,4-bis(2,2,6,6-tetramethyl-4-piperidyl)-2,3-butanedione, tris(2,2,6,6,-tetramethyl-4-piperidyl)trimellitate, 1,2,2,6,6-pentamethyl-4-piperidylstearate, 1,2,2,6,6,-pentamethyl-4-piperidyl n-octoate, bis(1,2,2,6,6,-pentamethyl-4-piperidyl)sebacate, tris(2,2,6,6,-tetramethyl-4-piperidyl)-nitrile acetate, 4-hydroxy-2,2,6,6,-tetramethylpiperidine, 4-hydroxy-1,2,2,6,6,-pentamethylpiperidine, and 1,1'-(1,2-ethanediyl)bis[3,3,5,5-tetramethylpiperazinone], alone or in any combination thereof.

When the photoalignment additive is less than about 0.001% of a total weight of the photoalignment material, the photoreactivity of the photoalignment material may be insignificant. When the photoalignment additive is greater than about 2% of the total weight of the photoalignment material, the photoalignment additive may function as impurities to induce afterimages and reduce a VHR. That is, an orientation of the liquid crystal molecules may be improved by the photoalignment additive; however, properties of an alignment layer in the LCD device may also deteriorate since electro-optical characteristics or alignment process characteristics of the optimized photoalignment polymer structure may be influenced by the photoalignment additive. Accordingly, the content of the photoalignment additive may be, for example, about 0.001% to about 2% of the total weight of the photoalignment material.

Organic Solvent

The organic solvent may dissolve the photoalignment polymer and the photoalignment additive. The organic solvent may include chlorobenzene, N-methylpyrrolidone, dimethylsulfoxide, toluene, chloroform, gamma-butyrolactone, methyl cellosolve, butyl cellosolve, butyl carbitol, and tetrahydrofuran, alone or in any combination thereof.

According to some exemplary embodiments of the present invention, a photoalignment material may include a photoalignment polymer, a photoalignment additive including an epoxy compound having two to four epoxy groups, and a remainder of an organic solvent.

The photoalignment polymer of the photoalignment material may be substantially identical to the photoalignment polymer described hereinabove. Accordingly, further description of the photoalignment polymer shall be omitted.

Photoalignment Additive.

The photoalignment additive may include an epoxy compound having two to four epoxy groups.

In some cases, the epoxy compound may include trimethylolpropane triglycidyl ether (TMTE), and N,N,N',N'-tetraglycidyl-4,4'-diaminodiphenylmethane (TGDDM), alone or in any combination thereof.

A carbon-oxygen bond of an epoxy group in the epoxy compound may be broken by heat, thereby causing an epoxy reaction between carboxylic acid and an amide group of the photoalignment polymer so that the epoxy compound may be coupled to a main chain of the photoalignment polymer. In addition, after the epoxy compound is coupled to the main chain of the photoalignment polymer, intramolecular reaction between the epoxy groups, which do not react with the photoalignment polymer, may be caused.

As a result of the epoxy reaction, a density of the alignment layer may be increased, and terminals of side chains may be densely disposed on a surface of the alignment layer, so that a change in the liquid crystal molecules' orientation may be prevented when electrical stress is applied by a voltage.

When the photoalignment additive is less than about 0.01% of a total weight of the photoalignment material, the photoreactivity of the photoalignment material may be insignificant. When the photoalignment additive is greater than about 3.5% of the total weight of the photoalignment material, afterimages may be generated, and a VHR or long-term stability may be reduced. Accordingly, the photoalignment additive may be, for example, about 0.01% to about 3.5% of the total weight of the photoalignment material.

The photoalignment material may further include a diamine compound having photoreactive parts represented by the following Chemical Formula 5.

Chemical Formula 5

In Chemical Formula 5, $R_1$ may independently represent —(CH$_2$)—, —O(CH$_2$)—, or

$R_2$, $R_3$ and $R_4$ may each independently represent —H, —O(CH$_2$)$_{m-1}$—CH$_3$ or and n and m may each independently represent an integer in the range of 1 to 8. $R_5$ may represent

$R_7$ may represent —H, —O(CH$_2$)$_{a-1}$—CH$_3$, or a and b may each independently represent an integer in the range of 1 to 8. $R_6$ may represent —O(CH$_2$)$_e$—CX$_2$—CY$_3$. X and Y may each independently represent H or F, and e may represent an integer in the range of 1 to 18.

Examples of a material that may be used for the diamine compound having photoreactive parts may include compounds represented by Chemical Formulas 6 to 12. However, it should be understood that the diamine compound is not limited to the examples set forth herein and that various suitable compounds may be used as the diamine compound.

Chemical Formula 6
Chemical Formula 7
Chemical Formula 8
Chemical Formula 9
Chemical Formula 10
Chemical Formula 11
Chemical Formula 12

The diamine compound having photoreactive parts represented by Chemical Formula 5 may be a catalyst promoting an epoxy reaction created by reacting the amine group with the epoxy group. The diamine compound may increase a density of a photoreaction, and may inhibit hydroxyl groups generated by the epoxy reaction to reduce photoalignment characteristics.

When the diamine compound is less than about 0.001% of a total weight of the photoalignment material, the reactivity of the diamine compound may be insignificant. When the diamine compound is greater than about 2% of the total weight of the photoalignment material, afterimages may be generated, and a VHR may be reduced. Accordingly, the content of the diamine compound may be, for example, about 0.001% to about 2% of the total weight of the photoalignment material.

A UV stabilizer may be about 0.01% to about 2% of a weight of the photoalignment material.

When the photoalignment additive is less than about 0.01% of a total weight of the photoalignment material, the photoreactivity of the photoalignment material may be insignificant. When the photoalignment additive is greater than about 2% of the total weight of the photoalignment material, the photoalignment additive may function as impurities to induce afterimages and reduce a VHR. Accordingly, the content of the photoalignment additive may be, for example, about 0.01% to about 2% of the total weight of the photoalignment material.

Hereinafter, different examples of preparing a photoalignment material are described and compared (in experiments) according to exemplary embodiments of the present invention.

Example 1

About 6% of the weight of the photoaligmnment material's weight may be a photoalignment polymer. The photoalignment polymer may be prepared by reacting 2,3,5-tricarboxycyclopentyl acetic dianhydride (TCA-AH) with a polymerized diamine compound. In some cases, Chemicals Formulas 8 and 10 may be used as the diamine compound, and, in some cases, Chemical Formula 11 may be used as the diamine compound. Chemical Formula 11 may have photoalignment parts represented by Chemical Formula 5 in a ratio of 4:1. In two prepared samples, a photoalignment additive, represented by Chemical Formula 1, may provide about 0.0035% and 0.009% of the photoaligmnment material's weight. About 93.9965% and 93.991% of the photoaligmnment material's weight may be provided by an organic solvent. About 30% (by weight) and 70% (by weight) of the organic solvent is composed of 2-butoxy ethanol and N-methylpyrrolidone, respectively. The photoalignment polymer, additive, and organic solvent may be mixed to form the photoalignment material. Properties of the photoalignment material are provided in TABLE 1.

Examples 2 to 4

In some cases, Chemical Formulas 2 to 4 ($R_1$ is $CH_2$ in Chemical Formula 4) may be used instead of the compound represented by Chemical Formula 1 to prepare the photoalignment material. Properties of photoalignment materials formed using Chemical Formulas 2 to 4 are provided as Examples 2 to 4 in TABLE 1.

Example 5

The photoalignment polymer may be made in the same way as in Example 1 and may provide about 6% of the photoalignment material's weight. An epoxy compound may provide about 0.6%, 0.798%, and 1.2% of the photoalignment material's weight in three different prepared photoalignment material samples. The epoxy compound may be represented by Chemical Formula 13 as a photoalignment additive. In these cases, about 93.4%, 93.202%, and 92.8% of the photoalignment material's weight may be the organic solvent, respectively. About 30% (by weight) and 70% (by weight) of the organic solvent may be comprised of 2-butoxy ethanol and N-methylpyrrolidone, respectively. The photoalignment polymer, additive, and organic solvent may be mixed to form the photoalignment material. Properties of the photoalignment material are provided in TABLE 1.

Chemical Formula 13

Example 6

The photoalignment polymer may be made in the same way as in Example 1 and may provide about 6% of the photoalignment material's weight. An epoxy compound may be represented by Chemical Formula 13 as a photoalignment additive. The epoxy compound may provide about 1.2% of the photoalignment material's weight. A diamine compound represented by Chemical Formula 11 may have photoreactive parts represented by Chemical Formula 5 and may be a photoalignment catalyst. The diamine compound may provide about 0.3%, 0.6%, and 0.9% of the photoalignment material's weight (for 3 different prepared samples). In these cases, about 92.5%, 92.2%, and 91.9% of the photoalignment material's weight may be the organic solvent, respectively. About 30% and 70% (by weight) of the organic solvent may be 2-butoxy ethanol and N-methylpyrrolidone, respectively. The photoalignment polymer, additive, and organic solvent may be mixed to form the photoalignment material. Properties of the photoalignment material are provided in TABLE 1.

Example 7

The photoalignment polymer may be made in the same way as in Example 1 and may provide about 6% of the photoalignment material's weight. The photoalignment additive may include a UV stabilizer represented by Chemical Formula 3, and an epoxy compound represented by Chemical Formula 13. The UV stabilizer may provide about 0.06% of the photoalignment material's weight. The epoxy compound may provide about 0.798% and 1.2% of the photoalignment material's weight (for two different prepared samples). About 93.142% and 92.74% of the photoalignment material's weight may be the organic solvent, respectively. About 30% and 70% (by weight) of the organic solvent may be 2-butoxy ethanol and N-methyl pyrrolidone, respectively. The photoalignment polymer, additive, and organic solvent may be mixed to form the photoalignment material. Properties of the photoalignment material are provided in TABLE 1.

Comparative Example 1

The photoalignment polymer may be made in the same way as in Example 1 and may be about 6% of the photoalignment material's weight. About 94% of the photoalignment material's weight may be an organic solvent. The photoalignment polymer and organic solvent may be mixed with each other to prepare the photoalignment material. About 30% and 70% (by weight) of the organic solvent may be 2-butoxy ethanol and N-methylpyrrolidone, respectively. Properties of the photoalignment material are provided in TABLE 1.

TABLE 1

|  | Viscosity (cps) | Mn (10K) | Mw (10K) | Polydispersity (PD) |
| --- | --- | --- | --- | --- |
| Example 1 | 17.2 | 9.25 | 17.43 | 1.88 |
| Example 2 | 17.1 | 9.15 | 17.32 | 1.85 |
| Example 3 | 17.5 | 9.31 | 17.45 | 1.91 |
| Example 4 | 17.8 | 9.41 | 17.55 | 1.94 |
| Example 5 | 18.4 | 9.71 | 17.71 | 1.82 |
| Example 6 | 17.6 | 9.78 | 17.86 | 1.96 |
| Example 7 | 18.4 | 10.35 | 18.05 | 1.99 |
| Comparative Example 1 | 17.2 | 9.03 | 17.01 | 1.88 |

Evaluation of an Alignment Layer

Experiment 1

The photoalignment materials of Examples 1 to 4 or Comparative Example 1 may be respectively coated on a display substrate, and may then be prebaked at about 80° C., and then cured at about 200° C. for about 10 to 60 minutes. Thereafter, UV light of about 1 J/cm$^2$ may be irradiated onto the substrate in an anti-parallel direction by using a UV exposure device. The UV may be linearly polarized, and may be irradiated in a direction inclined by about 40° when a direction perpendicular to a surface of the display substrate is considered to be about 0°.

Tests for evaluating a VHR (at 10 Hz, 1 V/room temperature), black afterimages, surface afterimages, DC conversion and a pretilt angle of the LCD panel were performed and the obtained results are provided in TABLE 2.

TABLE 2

| No. | Materials | Weight % (Photoalignment Additive) | VHR | Black Afterimages | Surface Afterimages | DC Conversion | Pretilt Angle |
| --- | --- | --- | --- | --- | --- | --- | --- |
| 1 | Comparative Example 1 | 0 | 98.50 | Weak | 2.9 | Exists | 89.49 |
| 2 | Example 1 | 0.003 wt % | 98.57 | Weak | 3.0 | Exists | 89.42 |
| 3 |  | 0.009 wt % | 98.57 | Weak | 2.9 | Exists | 89.45 |
| 4 | Example 2 | 0.003 wt % | 98.58 | Weak | 2.9 | Exists | 89.45 |
| 5 |  | 0.009 wt % | 98.59 | Weak | 3.1 | Exists | 89.44 |
| 6 | Example 3 | 0.003 wt % | 98.64 | Weak | 3.0 | Exists | 89.45 |
| 7 |  | 0.009 wt % | 98.60 | Weak | 3.0 | Exists | 89.48 |
| 8 | Example 4 | 0.003 wt % | 98.62 | Weak | 3.1 | Exists | 89.49 |
| 9 |  | 0.009 wt % | 98.59 | Weak | 3.2 | Exists | 89.42 |

Referring to TABLE 2, the VHR may be about 99.0%, and liquid crystal molecules of the LCD panel may have a pretilt angle of about 89.0°. Furthermore, the display panel may display a relatively clear image without stains. In addition, afterimages may not appear on the screen of the LCD panel after a checker flag pattern is displayed on the LCD panel at about 50° C. for about 24 hours. The LCD panel formed by using the photoalignment material of Comparative Example 1 may have the lowest VHR.

Thus, it can be noted that the LCD panel formed by using the photoalignment material of Examples 1 to 4 may have afterimage characteristics equal to the LCD panel formed by using the photoalignment material of Comparative Example 1, and may increase the average VHR. Accordingly, the LCD panel formed by using the photoalignment material of Examples 1 to 4 may have superior alignment characteristics.

Experiment 2

An LCD panel was prepared through a method substantially identical to the method of manufacturing the LCD panel in Experiment 1 except that the photoalignment materials of Example 5 or Comparative Example 1 may be used for forming a photoalignment material.

Tests for evaluating a VHR (at 10 Hz, 1 V/room temperature), black afterimages, surface afterimages, DC conversion, a pretilt angle and a thickness of alignment layer of the LCD panel were performed. The results are provided in TABLE 3.

Referring to TABLE 3, the VHR may be about 99.0%, and liquid crystal molecules of the LCD panel may have a pretilt angle of about 89.0°. Furthermore, the display panel may display a relatively clear image without stains, and afterimages may not appear on the screen of the LCD panel. In addition, the thickness of the alignment layer in the LCD panel formed by using the photoalignment material of the Comparative Example 1 was about 1,126 nm. However, the thickness of the alignment layer in the LCD panel formed by using the photoalignment material of Example 5 may increase to be between approximately 1,286 nm and 1,373 nm.

Thus, the LCD panel formed by using the photoalignment material of Example 5 may have a superior VHR value when compared to the LCD panel formed by using the photoalignment material of Comparative Example 1. Furthermore, it can be noted that alignment stability may be improved when a thickness of the alignment layer is increased.

Referring to TABLE 4, the VHR (when using Example 6) may be about 99.27%, and liquid crystal molecules of the LCD panel may be inclined to have a pretilt angle of about 89.3°. Furthermore, the LCD panel may display a relatively clear image without stains, and afterimages may not appear on the screen of the LCD panel. However, the LCD panel formed by using the photoalignment material of Comparative Example 1 may have a lower VHR.

Thus, it can be noted that the LCD device formed by using the photoalignment material of Example 6 may have afterimage characteristics equal to the LCD device formed by using the photoalignment material of Comparative Example 1, while having a slightly higher average VHR. Accordingly, the LCD panel formed by using the photoalignment material of Example 6 may have superior alignment characteristics.

Experiment 4

An LCD panel may be prepared through a method substantially identical to the method of manufacturing the LCD panel in Experiment 1 except that the compounds of Example 7 or Comparative Example 1 may be used for forming a photoalignment material.

Tests for evaluating a VHR (at 10 Hz, 1 V/room temperature), black afterimages, surface afterimages, DC conversion, a pretilt angle and a thickness of alignment layer of the LCD panel were performed. The results are provided in TABLE 5.

TABLE 3

| No | Materials | Weight % (Photoalignment Additive) | VHR | Black Afterimages | Surface Afterimages | DC Conversion | Pretilt Angle | Thickness of Alignment Layer |
|---|---|---|---|---|---|---|---|---|
| 1 | Comparative Example 1 | 0 | 98.85 | Weak | 3.0 | Exists | 9.41 | 1,126 |
| 2 | Example 5 | 0.006 wt % | 99.14 | Weak | 3.0~3.1 | Exists | 9.37 | 1,286 |
| 3 | | 0.798 wt % | 99.18 | Weak | 3.0~3.1 | Exists | 9.45 | 1,375 |
| 4 | | 1.2 wt % | 99.18 | Weak | 2.9~3.0 | Exists | 9.39 | 1,373 |

Experiment 3

An LCD panel may be prepared through a method substantially identical to the method of manufacturing the LCD panel in Experiment 1 except that the compounds of Example 6 or Comparative Example 1 may be used for forming a photoalignment material.

Tests for evaluating a VHR (at 10 Hz, 1 V/room temperature), black afterimages, surface afterimages, DC conversion, and a pretilt angle of the LCD panel were performed. The results are provided in TABLE 4.

TABLE 4

| No | Materials | Weight % (Diamine Compound) | VHR | Black Afterimages | Surface Afterimages | DC Conversion | Pretilt Angle |
|---|---|---|---|---|---|---|---|
| 1 | Comparative Example 1 | 0 | 98.96 | Weak | 2.9 | Exists | 89.3 |
| 2 | Example 6 | 0.3 wt % | 99.27 | Weak | 2.8~2.9 | Exists | 89.2 |
| 3 | | 0.6 wt % | 99.26 | Weak | 2.8 | Exists | 89.3 |
| 4 | | 0.9 wt % | 99.25 | Weak | 2.8 | Exists | 89.5 |

TABLE 5

| No. | Materials | Weight % | | | Black Afterimages | Surface Afterimages | DC Conversion | Pretilt Angle | Thickness of Alignment Layer |
|---|---|---|---|---|---|---|---|---|---|
| | | UV Stabilizer | Epoxy Compound | VHR | | | | | |
| 1 | Comparative Example 1 | 0 | 0 | 98.51 | Weak | 2.9~3.0 | Exists | 89.30 | 1,054 |
| 2 | Example 7 | 0.06 wt % | 0.798 wt % | 99.10 | Weak | 2.9 | Exists | 89.40 | 1309 |
| 3 | | 0.06 wt % | 1.2 wt % | 99.22 | Weak | 3.0 | Exists | 89.38 | 1,350 |

Referring to TABLE 5, the VHR (when using Example 7) may be about 99.2%, and liquid crystal molecules of the LCD panel may be inclined to have a pretilt angle of about 89.38°. Furthermore, the display panel may display a relatively clear image without stains, and afterimages may not appear on the screen of the LCD panel. In addition, the thickness of an alignment layer in an LCD panel formed by using the photoalignment material of the Comparative Example 1 may be about 1,054 nm. However, the thickness of an alignment layer in an LCD panel formed by using the photoalignment material of Example 7 may increase to about 1,350 nm.

Thus, the LCD panel formed by using the photoalignment material of Example 7 may have a superior VHR value when compared to the LCD panel formed by using the photoalignment material of Comparative Example 1.

Hereinafter, a method of manufacturing a display substrate using a photoalignment material according to exemplary embodiments of the present invention will be described with reference to FIG. 1, FIG. 2, FIG. 3, and FIG. 4.

Figure 1:
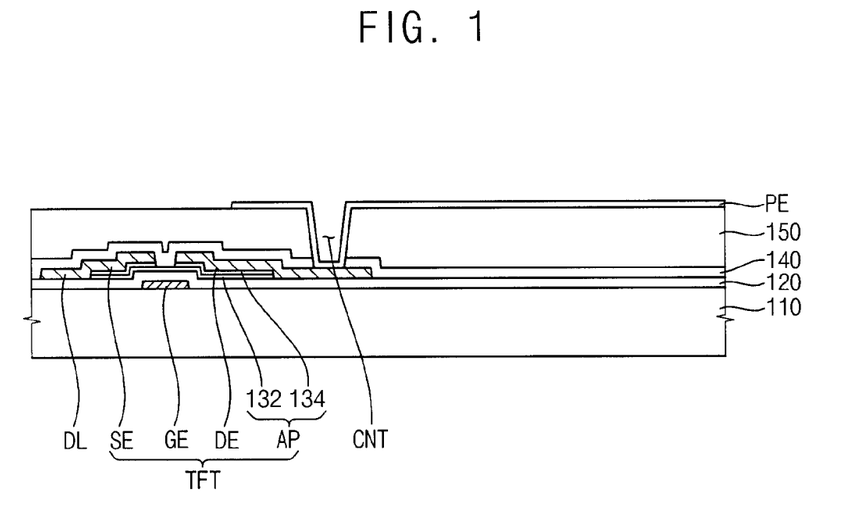
FIG. 1 and FIG. 2 are cross-sectional views illustrating a process for manufacturing a display substrate according to exemplary embodiments of the present invention.
Figure 2:
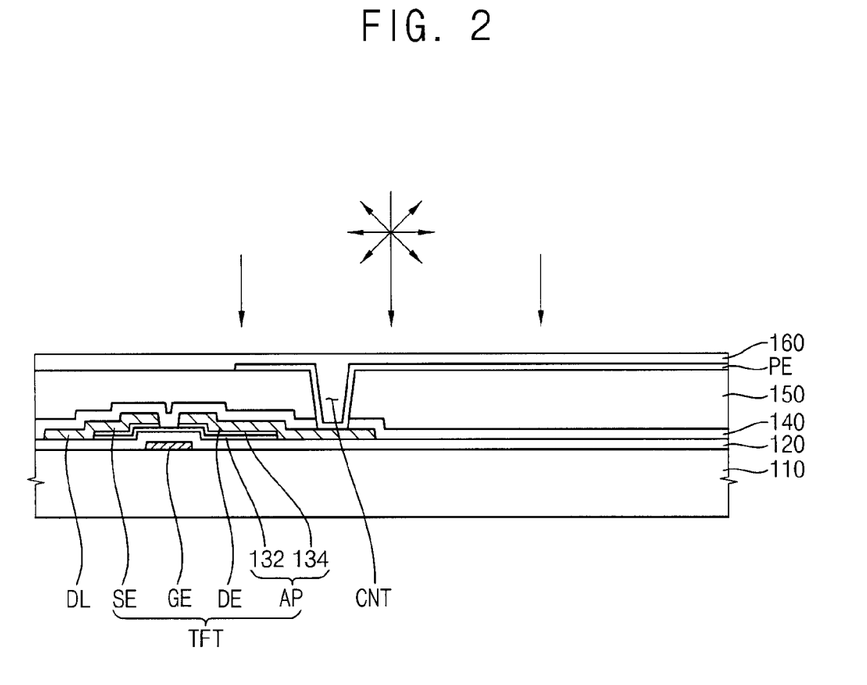

FIG. 1 and FIG. 2 are cross-sectional views illustrating a display substrate prepared according to the exemplary method of manufacture provided herein.

Referring to FIG. 1, a pixel unit may be formed on a surface of a first base substrate 110. The pixel unit may include a gate line (not shown), a data line DL, a switching device TFT connected to the gate and data lines DL, a gate insulation layer 120, a passivation layer 140, an organic layer 150 and a pixel electrode PE.

The TFT structure may be formed in part by forming a gate metal layer on a surface of the first base substrate 110, patterning the gate metal layer by a photolithography process, and then etching the gate metal layer to form the gate line and a gate electrode GE electrically connected to the gate line.

The gate insulation layer 120 and an active pattern AP may be formed sequentially on the surface of the first base substrate 110 having already disposed thereon the gate line and the gate electrode GE. The active pattern AP may be formed on a surface of the gate insulation layer 120 and may include an ohmic contact layer 134 and a semiconductor layer 132. The semiconductor layer 132 may be made from, for example, amorphous silicon. The ohmic contact layer 134 may be formed on the semiconductor layer 132 and may have n-type impurities implanted at a high concentration.

A data metal layer may then be formed on a portion of the gate insulation layer 120 having the active pattern AP, such that the data metal layer may cover the active pattern AP. The data metal layer may then be patterned by a photolithography process and etched to form data line DL, a source electrode SE electrically connected to the data line DL, and a drain electrode DE spaced apart from the source electrode SE and thereby not connected directly to the data line DL and source electrode SE. The switching device TFT may include the gate electrode GE, the active pattern AP, the source electrode SE, and the drain electrode DE.

The passivation layer 140 may be disposed on the gate insulation layer 120, the data line DL, the source electrode SE, and the drain electrode DE. The organic layer 150 may be formed on the passivation layer 140. A portion of the passivation layer 140 and the organic layer 150 overlying the drain electrode DE may be removed to form a contact hole CNT, thereby exposing a portion of the drain electrode DE.

The pixel electrode PE may be formed by depositing a pixel electrode metal layer on the organic layer 150 and in the contact hole CNT. The pixel electrode metal layer may be patterned using a photolithography process and etched to form the pixel electrode PE. The pixel electrode PE may thus be electrically connected to the switching device TFT through the contact hole CNT.

Referring to FIG. 2, photoalignment material may be disposed on the organic layer 150 and the pixel electrode PE to form a first a photoalignment material layer 160 as part of a first alignment substrate.

In some cases, the photoalignment material may include a photoalignment polymer, a photoalignment additive having a UV stabilizer to block or to absorb UV light, and an organic solvent.

In some cases, the photoalignment material may include a photoalignment polymer, a photoalignment additive including an epoxy compound having two to four epoxy groups, and an organic solvent.

The photoalignment material may be substantially the same as the photoalignment material described hereinabove, and therefore further explanation of the photoalignment material composition will not be repeated.

The first photoalignment material layer 160 may be pre-baked at a temperature of about 50° C. to 70° C., and may then be hard-baked at about 180° C. to 220° C. Thereafter, the first is photoalignment material layer 160 may be irradiated using polarized light of an appropriate wavelength (i.e., a wavelength that induces photolytic dimerization). Accordingly, an end of a branch group of the photoalignment polymer in the first photoalignment material layer 160 may be oriented so that the end of the branch group of the photoalignment polymer is tilted by a predetermined angle with respect to the surface of the first base substrate 110. Thus, a first alignment layer 160 having a specific orientation may be realized. The polarized light may be UV light with an intensity of about 0.5 $J/cm^2$ to 2 $J/cm^2$. The surface of the first alignment layer may be oriented at about 87° to 90° with respect to the surface of the first base substrate 110.

Figure 3:
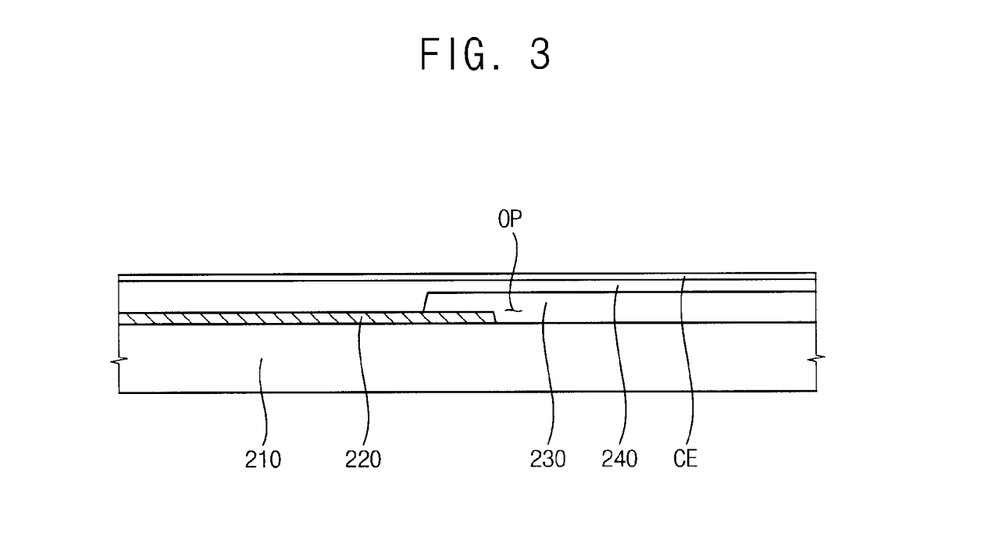
FIG. 3 and FIG. 4 are cross-sectional views illustrating a process for manufacturing a display substrate according to exemplary embodiments of the present invention.
Figure 4:
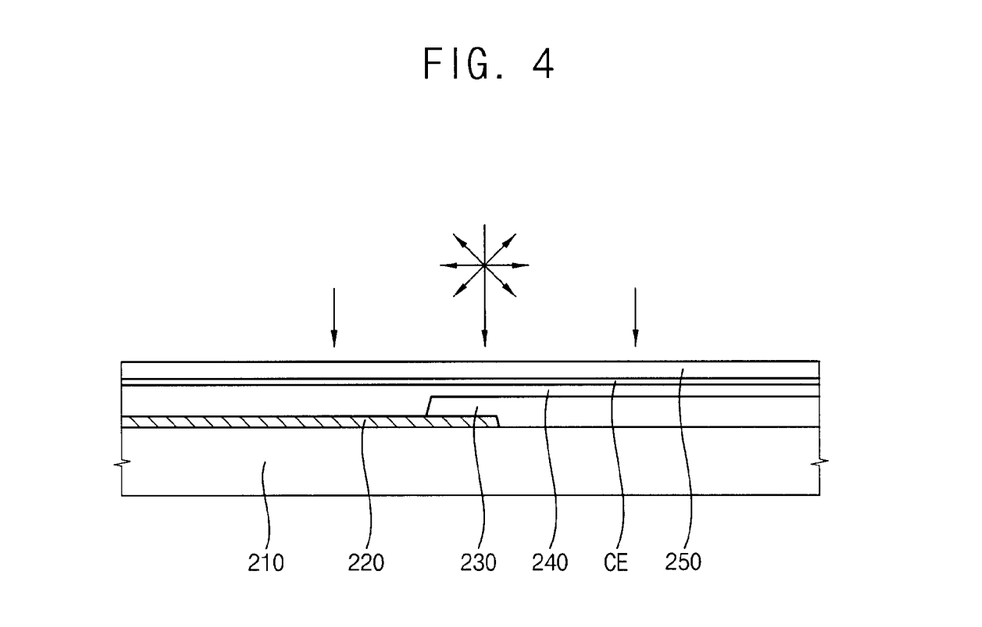

FIG. 3 and FIG. 4 are cross-sectional views illustrating a method of manufacturing a display substrate according to exemplary embodiments of the present invention.

Referring to FIG. 3, a pixel unit may be formed on a surface of a second base substrate 210. The pixel unit formed on the surface of the second base substrate 210 may include a black matrix pattern 220, a color filter 230, an overcoating layer 240, and a common electrode CE.

Further, a light-blocking layer (not shown) may be formed on the second base substrate 210, and then patterned by a photolithography process to form the black matrix pattern 220. The black matrix pattern 220 may have an opening portion OP to expose a portion of the second base substrate 210.

The color filter 230 may be formed in the opening portion OP of the second base substrate 210. For example, a color photoresist layer may be formed on a surface of the second base substrate 210, and then patterned by a photolithography process to form the color filter 230. Alternatively, color ink may be sprayed, dropped or otherwise deposited into the opening portion OP to form the color filter 230.

The overcoating layer 240 may be disposed on the black matrix pattern and the color filter 230. The common electrode CE may be formed on the overcoating layer 240.

Referring to FIG. 4, a second photoalignment material layer (not shown) may be formed on the second base substrate 210 having the common electrode CE. The second photoalignment material layer 250 may be irradiated with light (e.g., UV light) to form a second alignment layer 250. Processes for forming the second alignment layer 250 may be the same as the processes (e.g., examples) disclosed hereinabove for forming the first alignment layer 160 and a detailed description of forming the alignment layer shall therefore be omitted.

Figure 5:
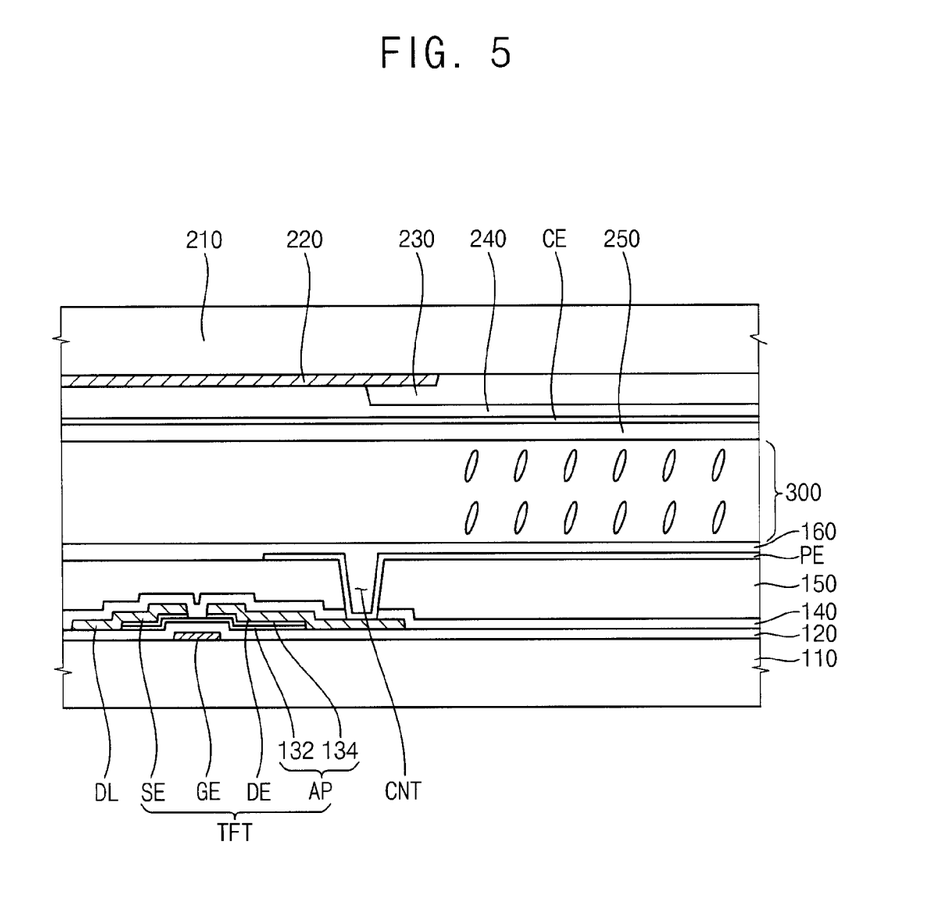
FIG. 5 is a cross-sectional view illustrating a display panel having the display substrate in FIG. 2 and FIG. 4.

FIG. 5 is a cross-sectional view illustrating an LCD panel including the display substrates illustrated in FIGS. 2 and 4.

Referring to FIG. 5, a display panel may include the first base substrate 110 having the first alignment layer 160, the second base substrate 210 having the second alignment layer 250, and a liquid crystal layer 300 disposed between the first base substrate 110 and the second base substrate 210.

In particular, liquid crystal molecules of the liquid crystal layer 300 may be disposed between the first alignment layer 160 and the second alignment layer 250. Alignment of the liquid crystal molecules may be determined by the electric field between the pixel electrode PE and the common electrode CE.

A photoalignment material having a UV stabilizer as a photoalignment additive may prevent reduction of the VHR and prevent afterimages from becoming worse according to a side reaction by irradiating UV light so that the display quality of LCD panel may be improved.

In addition, the photoalignment material may have an epoxy compound as a photoalignment additive that reacts to carboxylic acid and an amide group of an alignment layer to connect polyimide chains to each other, so that a stability of the alignment layer may be improved. Thus, the display quality and the reliability of a LCD device may be improved.

The foregoing is illustrative of the present invention and is not to be construed as limiting thereof. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A photoalignment material, comprising:
   a photoalignment polymer having a weight of about 1 percent to about 10 percent of a weight of the photoalignment material and including a polyimide;
   a photoalignment additive comprising an ultraviolet stabilizer to block or to absorb ultraviolet light, a weight of the photoalignment additive being about 0.001 percent to about 2 percent of the weight of the photoalignment material; and
   an organic solvent.

2. The photoalignment material of claim 1, wherein the ultraviolet stabilizer comprises at least one compound selected from the group consisting of a phenol compound, an aromatic amine compound, a benzophenone compound, a benzotriazole compound, an acrylate compound, and a salicylic acid derivative.

3. The photoalignment material of claim 2, wherein the ultraviolet stabilizer absorbs light having a wavelength in a range of about 290 nm to 400 nm.

4. The photoalignment material of claim 1, wherein the organic solvent comprises at least one chemical compound selected from the group consisting of chlorobenzene, N-methylpyrrolidone, dimethyl sulfoxide, dimethylformamide, toluene, chloroform, gamma-butyrolactone, methyl cellosolve, butyl carbitol, and tetrahydrofurane.

5. A photoalignment material, comprising:
   a photoalignment polymer having a weight of about 1 percent to about 10 percent of a weight of the photoalignment material;
   a photoalignment additive comprising an epoxy compound comprising two to four epoxy groups, a weight of the photoalignment additive being about 0.01 percent to about 3.5 percent of the weight of the photoalignment material; and
   an organic solvent.

6. The photoalignment material of claim 5, wherein the epoxy compound comprises at least one compound selected from the group consisting of trimethylolpropane triglycidyl ether (TMTE) and N,N,N',N'-tetraglycidyl-4,4'-diaminodiphenylmethane (TGDDM).

7. The photoalignment material of claim 5, further comprising a diamine compound comprising at least one photoreactive part, the diamine compound having a weight of about 0.001 percent to about 2 percent of the weight of the photoalignment material.

8. The photoalignment material of claim 5, further comprising an ultraviolet stabilizer to block or to absorb ultraviolet light, the ultraviolet stabilizer having a weight of about 0.001 percent to about 2 percent of the weight of the photoalignment material.

9. The photoalignment material of claim 8, wherein the ultraviolet stabilizer comprises at least one compound selected from the group consisting of a phenol compound, an aromatic amine compound, a benzophenone compound, a benzotriazole compound, an acrylate compound, and a salicylic acid derivative.

10. A method of manufacturing a display substrate, the method comprising:
    forming a pixel unit on a base substrate;
    forming an alignment layer by coating a photoalignment material on the base substrate, the photoalignment material comprising:
       about 1 percent to about 10 percent by weight of a photoalignment polymer, based on the total weight of the photoalignment material, the photoalignment polymer comprising a polyimide;
       an organic solvent; and
       about 0.001 percent to about 2 percent by weight of a photoalignment additive, based on the total weight of the photoalignment material, the photoalignment additive comprising an ultraviolet stabilizer to block or to absorb ultraviolet light; and irradiating light on the base substrate comprising the alignment layer.

11. The method of claim 10, wherein the ultraviolet stabilizer comprises at least one compound selected from the group consisting of a phenol compound, an aromatic amine compound, a benzophenone compound, a benzotriazole compound, an acrylate compound, and a salicylic acid derivative.

12. The method of claim 10, wherein forming the pixel unit on the base substrate comprises:
    forming a switching element on the base substrate, the switching element connected to a gate line and a data line; and
    forming a pixel electrode connected to the switching element.

13. The method of claim 10, wherein forming the pixel unit on the base substrate comprises:
    forming color filters on the base substrate; and
    disposing a common electrode on the base substrate comprising the color filters.

14. The method of claim 10, wherein irradiating the light comprises:
    irradiating about 10 mJ to 10 J of linearly polarized ultraviolet light in a direction inclined by an angle of about 0° to about 70° with respect to a vertical direction of the substrate.

15. A method of manufacturing a display substrate, the method comprising:
    forming a pixel unit on a base substrate;
    forming an alignment layer by coating a photoalignment material on the base substrate, the photoalignment material comprising a photoalignment polymer, an organic solvent, and a photoalignment additive comprising an epoxy compound having two to four epoxy groups; and
    irradiating light onto the base substrate comprising the alignment layer.

16. The method of claim 15, wherein forming an alignment layer comprises disposing the photoalignment material comprising:
    the photoalignment polymer having a weight of about 1 percent to about 10 percent of a weight of the photoalignment material;
    the photoalignment additive having a weight of about 0.01 percent to about 3.5 percent of the weight of the photoalignment material; and
    the organic solvent.

17. The method of claim 16, wherein the epoxy compound comprises at least one compound selected from the group consisting of trimethylolpropane triglycidyl ether (TMTE) and N,N,N',N'-tetraglycidyl-4,4'-diaminodiphenylmethane (TGDDM).

18. The method of claim 15, wherein the photoalignment material further comprises a diamine compound having at least on photoreactive part, the diamine compound having a weight of about 0.001 percent to about 2 percent of the weight of the photoalignment material.

19. The method of claim 15, wherein the photoalignment material further comprises an ultraviolet stabilizer to block or to absorb ultraviolet light, the ultraviolet stabilizer having a weight of about 0.001 percent to about 2 percent of the weight of the photoalignment material.

20. The method of claim 15, wherein irradiating the light comprises:
    irradiating about 10 mJ to 10 J of linearly polarized ultraviolet light in a direction inclined by an angle of about 0° to about 70° with respect to a vertical direction of the substrate.

* * * * *